United States Patent [19]

Coppola

[11] 4,277,333

[45] Jul. 7, 1981

[54] PORTABLE WATER FILTRATION SYSTEM

[76] Inventor: Peter J. Coppola, Two Garrity Rd., Burlington, Mass. 01803

[21] Appl. No.: 76,572

[22] Filed: Sep. 18, 1979

[51] Int. Cl.³ .............................................. B01A 27/08
[52] U.S. Cl. .................................. 210/136; 210/416.3
[58] Field of Search ................ 210/416 DW, 117, 136

[56] References Cited

U.S. PATENT DOCUMENTS

| | | | |
|---|---|---|---|
| 1,556,426 | 10/1925 | Coop | 210/416 DW |
| 2,526,656 | 10/1950 | Goetz | 210/416 DW |
| 2,566,371 | 9/1951 | Quinn | 210/416 DW |
| 2,670,081 | 2/1954 | Quinn | 210/416 DW |
| 3,950,253 | 4/1976 | Stean | 210/416 DW |
| 4,054,526 | 10/1977 | Mullet | 210/416 DW |

*Primary Examiner*—John Adee
*Attorney, Agent, or Firm*—E. Thorpe Barrett

[57] ABSTRACT

A portable water filtration system adapted to be carried by backpackers includes a pump, a filter mechanism and a storage compartment adjacent and laterally displaced from the pump, the physical arrangement providing a convenient, sturdy, compact and lightweight unit.

1 Claim, 6 Drawing Figures

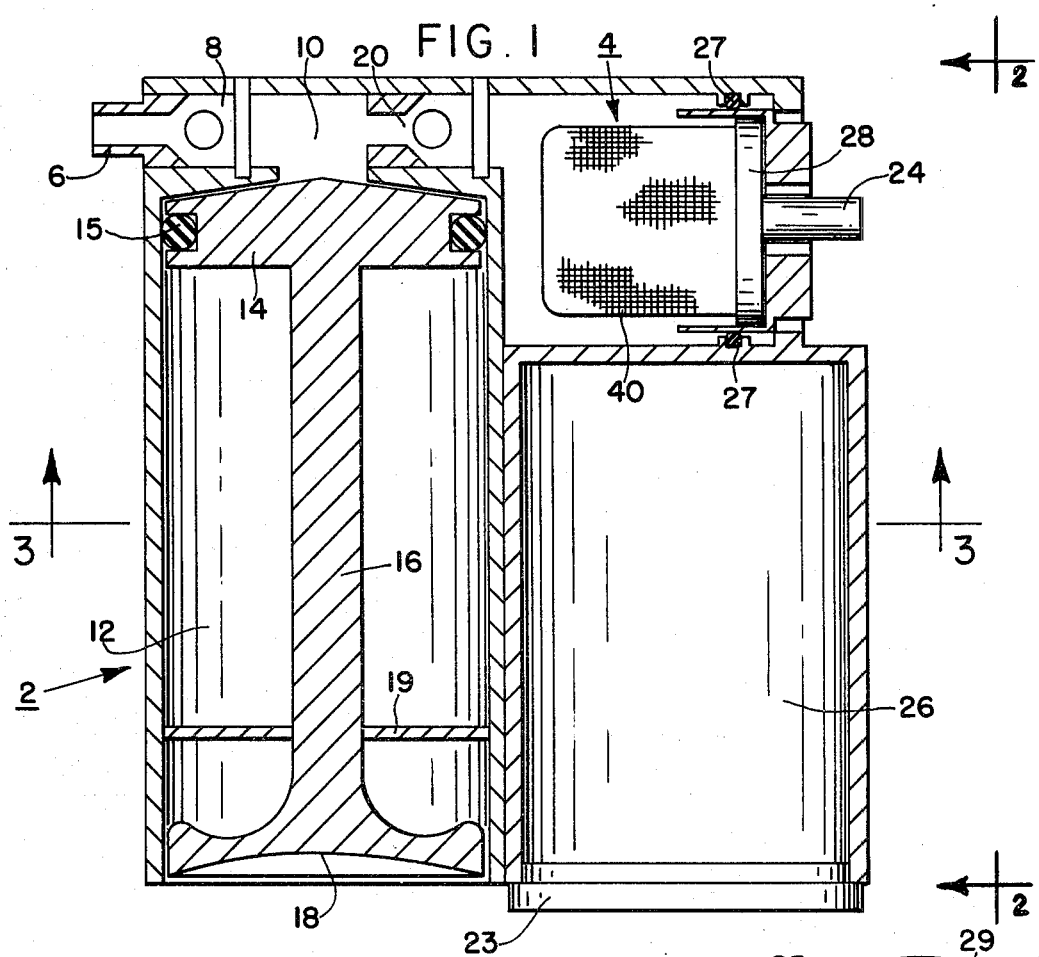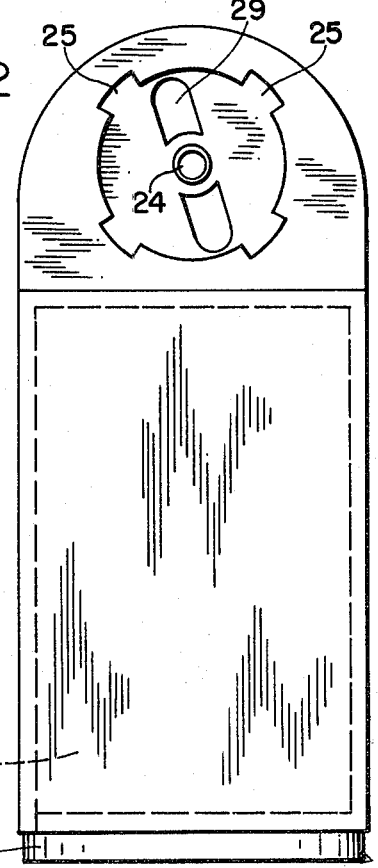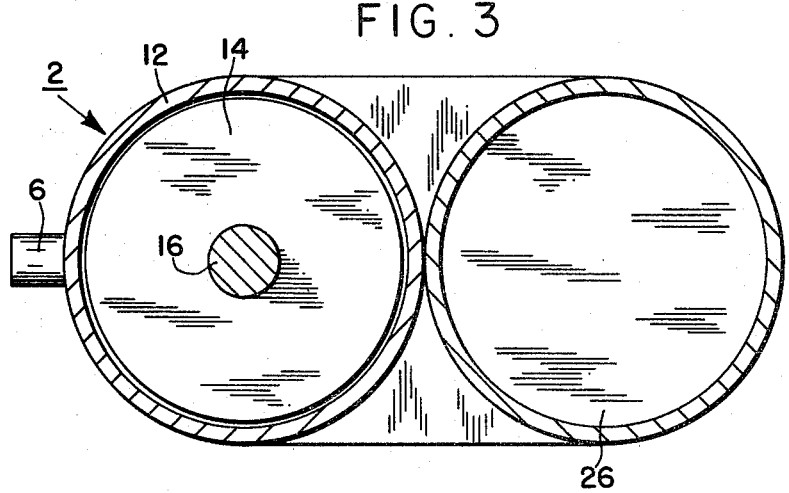

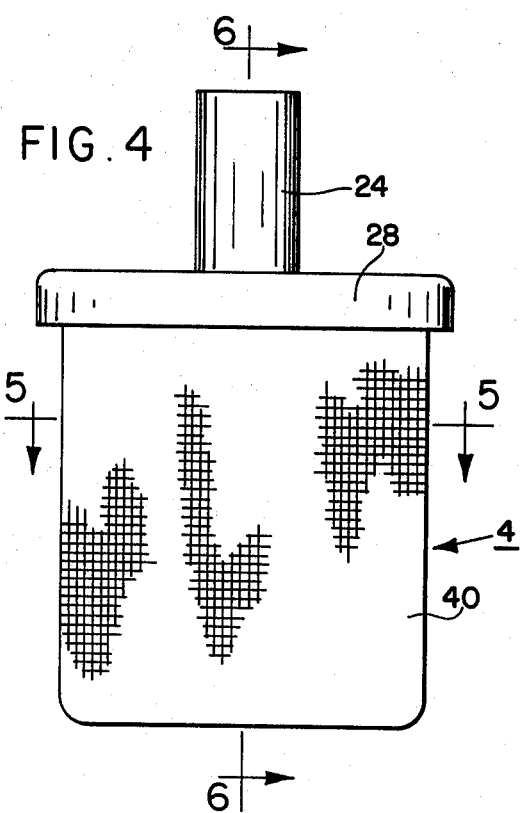
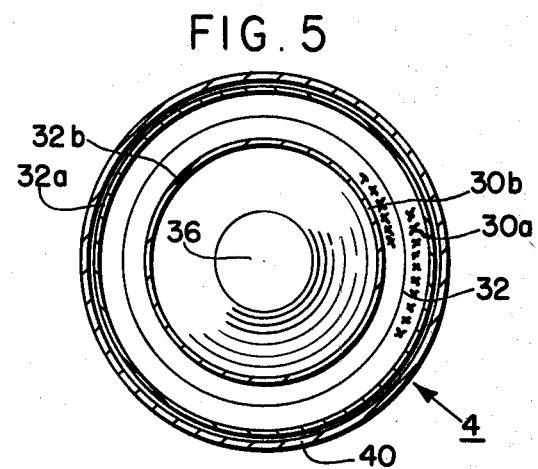
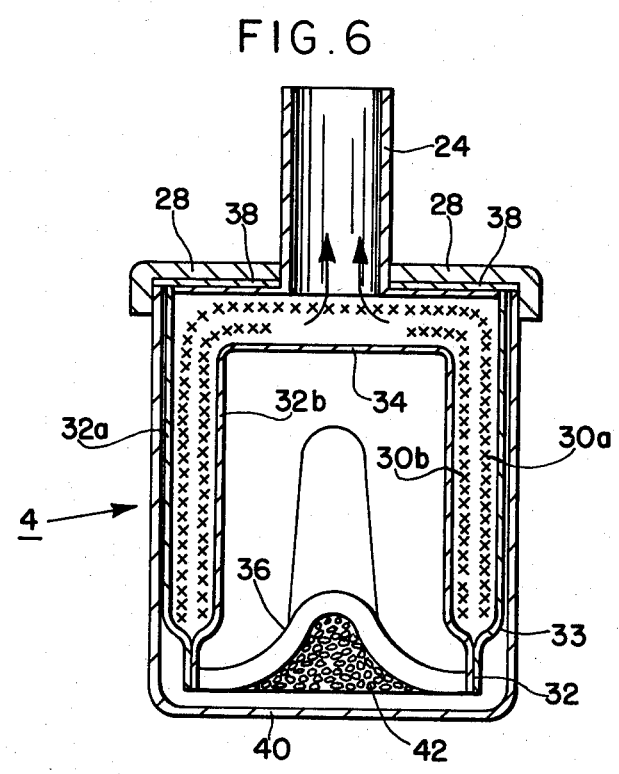

PORTABLE WATER FILTRATION SYSTEM

Various types of water filters have been designed but none have been well suited for use by the backpacker or for other applications in which a sturdy, compact and lightweight unit is required. The filtration system described here meets all the requirements for a backpacking application: It is small enough to be packed in a suitcase or backpack without taking substantial space away from the storage of other necessary articles; the weight is light enough, less than a pound, so that it does not add unduly to the burden of the backpacker; the unit is self-contained and includes a storage compartment which holds the flexible tubing used with the filter system; and a large surface filter for removing bacteria and sediment that has a life long enough to make it practical for relatively long periods of use without replacing the filter medium. The physical arrangement of the functional parts results in the requisite ruggedness and convenience.

It is accordingly an object of this invention to provide a small, compact, lightweight system for filtering water that is suitable for use in backpacking and which includes a readily replaceable filter medium that has sufficient filter life to be practical. It is also an object to provide a filtration system in which the physical arrangement is such that adequate storage space is provided, the shape facilitates easy handling and packing, and which is inherently rugged as is required for its intended use.

These and other objects will be in part pointed out in and in part apparent from the following description of a preferred embodiment of the invention, considered in conjunction with the accompanying drawings in which:

FIG. 1 is a sectional view through a water filtration system embodying the invention;

FIG. 2 is a side view looking in the direction of arrow 2 of FIG. 1;

FIG. 3 is a sectional view taken along line 3—3 of FIG. 1;

FIG. 4 is a side view of the filter assembly;

FIG. 5 is a sectional view taken along line 5—5 of FIG. 4; and

FIG. 6 is a section view taken along line 6—6 of FIG. 4.

In operation, the water to be filtered is drawn into the water filtration unit by a hand-operated pump, generally indicated at 2, and expelled through a replaceable filter assembly, generally indicated at 4.

An inlet port 6 is adapted to be connected to a length of flexible plastic tubing (not shown) that extends into the source of water to be filtered. The port 6 communicates through a unidirectional valve 8, which may be a ball or other type valve, and conduit 10 to a cylinder 12 of the pump 2. The pump 2 includes a piston 14, having an O-ring seal 15, which is connected by a shaft 16 to an operating handle 18. A supporting partition 19 guides and limits the movement of the piston 14.

When the handle 18 is withdrawn, the cylinder is filled with water to be filtered: when the handle is pushed inwardly, the water is forced through the conduit 10, a second unidirectional valve 20 and the replaceable filter assembly 4 to an outlet port 24. The outlet port 24 may be connected to a second length of plastic tubing (not shown) to direct the filtered water into any desired container.

It is important in a portable water filter for the intended application that all auxiliary apparatus to be used with the filter be stored within the unit. For this reason, a storage chamber 26 is positioned adjacent to the pump 2 with its longitudinal axis extending parallel with the longitudinal axis of the pump 2. The storage chamber 26, which may be of any desired cross sectional shape, is rigidly secured to the pump 2 or, preferably, molded of plastic as an integral part of the pump assembly. By this construction, the chamber 26 forms not only a useful storage space but reinforces the pump structure permitting the use of lighter weight materials, an important feature for any equipment that must be manually transported for long distances. In addition, the arrangement and positioning of the chamber 26 results in a cross sectional shape and size, such that the filter can be effectively grasped and held by one hand while the other hand operates the pump plunger. The storage chamber is closed by a removeable cap 23. This compact construction permits the filter to be readily stored in a crowded backpack without danger of damage to the filter because of stresses produced by the arrangement and forces exerted by other items in the pack.

The filter medium itself must also meet rigid requirements. A fundamental necessity is that the filter function effectively in filtering water that would otherwise be undrinkable. As a first step, large pieces of suspended sediment or impurities must be removed to avoid unnecessarily clogging a subsequent filter medium with smaller openings. The finer filter medium should be effective in removing the kinks of bacteria that frequently contaminate open water. In addition, it is important that the water be exposed to an absorbent material such as activated charcoal, having a large surface area for the removal of materials that cause undesirable odors or taste. This absorbent material is advantageously mixed with germicidal metals such as silver or copper.

The filter medium must also be provided with a relatively large surface area, particularly the filter medium having the smaller pores, so that sufficient filtering speed can be obtained with the available pressures. It is also important to provide a surface area large enough that the life of the filter will adequately purify all the water needed for an extended trip. The filter assembly illustrated in FIGS. 4, 5, and 6 meets these objectives and is readily replaceable when the filtering action is exhausted.

The filter assembly 4 includes a rigid cap 28 of plastic or other suitable material having four ears that pass through openings 25 into a suitable interlock groove in the shell of the unit by which the filter is removably secured in the assembly. A water-tight seal is formed by an O-ring 27. The outlet port 24 is formed integrally with the cap 28 which carries two tabs 29 to facilitate turning of the cap.

The inner section of the filter is formed by two circular sheets of plastic mesh 30a and 30b which are sealed together, as at 32, by heat or other means, around the outer circumferences, the mesh being shaped as at 33 and of sufficient rigidity to hold the two layers of plastic mesh in spaced relationship. The outer surface of each circular plastic mesh is covered with a layer of filter paper 32a and 32b, or other flexible material having, for example, filter pores of about 1 micron. This flat circular filter element comprising the spaced layers of plastic mesh 30a and 30b, covered respectively on the outer surfaces by the layers 32a and 32b of the filter paper, is then folded into a generally cup-shaped form as illustrated in FIG. 6. This shaping produces a relatively flat bottom area as at 34 and a convoluted side portion as indicated by the convolution 36. This filter element is thus confined in a small space while retaining a relatively large filter area.

The layer 32b of filter paper and the layer 30b of the plastic mesh are each provided with a central opening around the outlet port 24 to permit the free flow of the purified water from the space between the two layers of plastic mesh into the outlet port 24.

To prevent water from by-passing this filter element by going around rather than through the filter paper, a circular seal 38 is formed around the outlet port 24 and joins the filter paper to the inner surface of the cap 28. This seal may be formed by mechanical, adhesive, or heat seal means.

The filter unit is enclosed in a gross filter 40 of relatively rigid material that is formed into a cup shape with the rim portions around its open end secured within the lip portion of the cap 28. The space within the plastic mesh defined by the filter paper is filled with water-conditioning material 42, such as powdered activated charcoal and atomic silver to provide odor removal and germicidal functions.

In use the filter assembly 4 is inserted into the water purifying unit, as illustrated in FIG. 1, with the O-ring 27 forming a water tight seal within the water-purifying assembly. The water from the cylinder 12 is forced through the conduit 10 into the cavity containing the filter assembly 4 where it passes through the gross filter medium 40, which may have filter pores of 5 microns or larger, that removes the larger particles of suspended impurities. The water then passes through the conditioning material 42 and through the filter medium 32a and 32b, which may have pores 1 micron in diameter, that removes bacteria and smaller particles of impurities. The water passes into the space within the plastic mesh and through the outlet port 24.

The capacity of the filter assembly 4 depends on the concentration of the impurities in the water that is being treated, but can be readily designed to have sufficient capacity, even under adverse conditions, to accommodate the requirements of an extended backpack trip. When the filtering capacity is exhausted, either the cap 28 with the attached filter medium or the entire assembly 4 is readily replaced.

From the foregoing, it will be seen that my invention is well adapted to attain the ends and objects herein set forth, that it can be economically manufactured, and that it is subject to a variety of modifications to best suit it to the conditions of each particular use.

What is claimed is:

1. A portable water filtration system comprising
a pump having a cylinder, a piston and an actuating handle,
an inlet port communicating with said cylinder,
a first check-valve means positioned between said inlet port and said cylinder and arranged to permit the unidirectional flow of water into said cylinder,
removable filter means positioned adjacent to and laterally displaced from the longitudinal axis of said cylinder,
an outlet duct communicating with said cylinder and said filter means,
a second check-valve means positioned in said outlet duct and arranged to permit the unidirectional flow of water from said cylinder,
a storage chamber having rigid walls and being positioned adjacent and rigidly secured to said cylinder with its longitudinal axis extending substantially parallel with the longitudinal axis of said cylinder, whereby the storage chamber mechanically reinforces said pump, and
an integral unitary body having a first cavity joining said cylinder, a second cavity forming said storage chamber, and a third cavity adapted to removably retain said filter means, said filter means being positioned substantially along a common axis displaced laterally from the longitudinal axis of said cylinder.

* * * * *